US011079002B2

(12) United States Patent
Herbst et al.

(10) Patent No.: US 11,079,002 B2
(45) Date of Patent: Aug. 3, 2021

(54) BEARING CARRIER OR HOUSING PART, AND METHOD FOR MANUFACTURING A BEARING CARRIER OR A HOUSING PART

(71) Applicant: Aktiebolaget SKF, Gothenburg (SE)

(72) Inventors: Hubert Herbst, Gädheim (DE); Manfred Aigner, Lindau (DE); Jürgen Barthelme, Grettstadt (DE); Helmut Hauck, Euerbach (DE)

(73) Assignee: AKTIEBOLAGET SKF, Gothenburg (SE)

( * ) Notice: Subject to any disclaimer, the term of this patent is extended or adjusted under 35 U.S.C. 154(b) by 287 days.

(21) Appl. No.: 16/032,195

(22) Filed: Jul. 11, 2018

(65) Prior Publication Data

US 2019/0048985 A1 Feb. 14, 2019

(30) Foreign Application Priority Data

Aug. 8, 2017 (DE) .......................... 102017213827.0

(51) Int. Cl.
*F16H 55/32* (2006.01)
*F16C 35/04* (2006.01)
(Continued)

(52) U.S. Cl.
CPC .............. *F16H 55/32* (2013.01); *F02B 67/06* (2013.01); *F16C 19/26* (2013.01); *F16C 19/54* (2013.01);
(Continued)

(58) Field of Classification Search
CPC ............... Y10T 74/2186; F16C 13/006; F16C 2361/63; F16H 2007/0865;
(Continued)

(56) References Cited

U.S. PATENT DOCUMENTS 2,171,158 A * 8/1939 McCann .................... F16H 9/24
474/88
2,204,084 A * 6/1940 Hughes .................. D01H 1/241
384/540
(Continued)

FOREIGN PATENT DOCUMENTS

CH 652176 A5 10/1985
DE 825934 C 12/1951
(Continued)

OTHER PUBLICATIONS

Office action from the German Patent Office dated Mar. 6, 2018 in related application No. DE 10 2017 213 827.0, and translation thereof.

*Primary Examiner* — Henry Y Liu
(74) *Attorney, Agent, or Firm* — J-TEK Law PLLC; Scott T. Wakeman; Mark A. Ussai (57) ABSTRACT

A bearing carrier or a housing part includes a base body, a first component and at least one second component mounted in the base body, and a belt or a cable or a roving connected to the base body and to the first component and the second component such that the belt or the cable or the roving at least partially transmits forces that act on the first component to the second component. The first and second components may each be formed as rings having a cylindrical inner surface and an outer surface having a groove, and the element may pass through the grooves of the first and second components and be embedded in the base body.

17 Claims, 5 Drawing Sheets

(51) Int. Cl.
  *F16C 35/077* (2006.01)
  *F02B 67/06* (2006.01)
  *F16C 19/26* (2006.01)
  *F16C 19/54* (2006.01)
  *F16C 35/067* (2006.01)

(52) U.S. Cl.
  CPC .......... *F16C 35/042* (2013.01); *F16C 35/067* (2013.01); *F16C 35/077* (2013.01); *F16C 2202/32* (2013.01); *F16C 2208/02* (2013.01); *F16C 2326/01* (2013.01); *F16C 2360/22* (2013.01); *F16C 2360/43* (2013.01)

(58) Field of Classification Search
  CPC . F16H 2057/02043; F16H 2057/02086; F16H 7/021; F16H 57/033; F16D 2121/24; F16D 2125/50; F16D 65/18; F16D 2125/48
  USPC .......................................... 474/144; 384/428
  See application file for complete search history.

(56) References Cited

U.S. PATENT DOCUMENTS

| | | | | |
|---|---|---|---|---|
| 3,752,014 | A * | 8/1973 | Holtan | F16H 57/035 74/745 |
| 3,766,792 | A * | 10/1973 | Braun | E21C 29/16 474/144 |
| 3,950,046 | A * | 4/1976 | Lubbersmeyer | F16C 13/006 384/546 |
| 4,028,964 | A * | 6/1977 | Jones | F16H 7/06 74/606 R |
| 4,661,086 | A * | 4/1987 | Railsback | F16H 7/023 474/84 |
| 4,723,619 | A * | 2/1988 | Yamamoto | B62M 7/06 180/219 |
| 4,966,572 | A * | 10/1990 | Kunkel | F04D 13/02 474/199 |
| 5,041,062 | A * | 8/1991 | Dornhoff | B60K 17/28 184/15.1 |
| 5,288,277 | A * | 2/1994 | Kummerfeld | A61G 12/002 474/198 |
| 5,649,844 | A * | 7/1997 | Caricof | B63H 23/06 192/150 |
| 5,704,868 | A * | 1/1998 | Lindsey | B60K 17/22 475/222 |
| 5,826,304 | A | 10/1998 | Carlson | |
| 5,967,930 | A * | 10/1999 | Ahluwalia | B60K 17/3465 180/247 |
| 6,053,072 | A * | 4/2000 | Schleuder | F16H 57/028 74/606 R |
| 6,220,982 | B1 * | 4/2001 | Kawashima | F16H 55/44 474/199 |
| 6,234,289 | B1 * | 5/2001 | Baker | B60K 17/3515 192/69.41 |
| 6,293,885 | B1 * | 9/2001 | Serkh | F16C 13/006 474/133 |
| 6,338,688 | B1 * | 1/2002 | Minami | F16H 57/029 474/144 |
| 6,572,270 | B2 * | 6/2003 | Takemura | F16C 13/006 384/476 |
| 6,652,336 | B1 * | 11/2003 | Chambers | B63H 20/14 440/75 |
| 6,662,684 | B1 * | 12/2003 | Krisher | F16H 57/028 474/144 |
| 6,866,602 | B2 * | 3/2005 | Iverson | F16H 7/1254 474/134 |
| 6,964,317 | B2 * | 11/2005 | Groves | B60G 3/145 180/344 |
| 7,011,593 | B2 * | 3/2006 | Schenk | F16C 33/723 474/199 |
| 7,021,415 | B2 * | 4/2006 | Farmer | B60T 13/741 180/275 |
| 7,108,623 | B2 * | 9/2006 | Cadarette | F16H 55/36 474/166 |
| 7,364,522 | B2 * | 4/2008 | Miyata | F16H 7/18 474/135 |
| 8,105,200 | B2 * | 1/2012 | Dettenberger | B60T 13/746 475/323 |
| 8,186,488 | B2 * | 5/2012 | Poertzgen | F16D 65/0006 188/162 |
| 8,382,620 | B2 * | 2/2013 | Morita | F16H 57/035 474/13 |
| 8,790,208 | B2 * | 7/2014 | Poertzgen | F16D 65/18 475/149 |
| 9,145,950 | B2 * | 9/2015 | Dettenberger | F16D 65/28 |
| 9,377,097 | B2 * | 6/2016 | Hoffman | A01C 3/063 |
| 9,410,590 | B2 * | 8/2016 | Jang | F16D 65/18 |
| 9,835,213 | B2 * | 12/2017 | Li | F16D 65/18 |
| 2002/0005191 | A1 * | 1/2002 | Maeda | F16H 57/0415 123/572 |
| 2004/0033851 | A1 * | 2/2004 | Lubben | F16C 33/586 474/8 |
| 2004/0178028 | A1 * | 9/2004 | Farmer | F16D 65/0006 188/162 |
| 2005/0229742 | A1 * | 10/2005 | Komura | F16H 57/031 74/606 R |
| 2005/0239591 | A1 * | 10/2005 | Schoenek | F16H 57/031 474/144 |
| 2005/0239592 | A1 * | 10/2005 | Schoenek | F16H 57/021 474/144 |
| 2006/0154760 | A1 * | 7/2006 | Brown | F16H 9/18 474/27 |
| 2008/0293534 | A1 * | 11/2008 | Dettenberger | H02K 7/116 475/154 |
| 2009/0050420 | A1 * | 2/2009 | Poertzgen | B60T 13/746 188/156 |
| 2010/0320043 | A1 * | 12/2010 | Yamasaki | F16D 65/18 188/162 |
| 2011/0024262 | A1 * | 2/2011 | Nurnberg | B66B 23/026 198/330 |
| 2012/0176857 | A1 * | 7/2012 | Fleishman | B01F 15/00006 366/343 |
| 2012/0190489 | A1 * | 7/2012 | Takagi | G03G 21/1647 474/148 |
| 2012/0325601 | A1 * | 12/2012 | Giering | F16D 65/0006 188/162 |
| 2013/0150193 | A1 * | 6/2013 | Fukano | F16H 7/18 474/148 |
| 2013/0180811 | A1 * | 7/2013 | Poertzgen | F16D 65/18 188/156 |
| 2014/0066242 | A1 * | 3/2014 | Seblante, Sr. | F16H 7/06 474/150 |
| 2014/0148289 | A1 * | 5/2014 | Anderson | F16H 7/023 474/150 |
| 2015/0078696 | A1 * | 3/2015 | Schmidt | F16C 19/181 384/504 |
| 2016/0327104 | A1 * | 11/2016 | Li | F16D 65/0006 |
| 2017/0190123 | A1 * | 7/2017 | Tomioka | B29C 70/504 |
| 2017/0204944 | A1 * | 7/2017 | Holzberger | F16H 25/2204 |
| 2017/0307008 | A1 | 10/2017 | Heege et al. | |
| 2018/0168402 | A1 * | 6/2018 | Arnett | B01F 15/0048 |
| 2018/0283507 | A1 * | 10/2018 | Lee | F16H 7/1281 |
| 2019/0101205 | A1 * | 4/2019 | Ishikawa | F16H 57/028 |
| 2019/0309164 | A1 * | 10/2019 | Takamoto | C08B 37/0015 |

FOREIGN PATENT DOCUMENTS

| | | |
|---|---|---|
| DE | 970311 C | 9/1958 |
| DE | 3416011 A1 | 5/1985 |
| DE | 3530981 A1 | 3/1987 |
| DE | 102013206350 A1 | 10/2014 |
| DE | 102014207400 A1 | 10/2015 |
| DE | 102014220375 A1 | 4/2016 |
| EP | 0068424 B1 | 4/1986 |
| GB | 1360780 A | 7/1974 |
| WO | 03046414 A1 | 6/2003 |

* cited by examiner

BEARING CARRIER OR HOUSING PART, AND METHOD FOR MANUFACTURING A BEARING CARRIER OR A HOUSING PART

CROSS-REFERENCE

This application claims priority to German patent application no. 10 2017 213 827.0 filed on Aug. 8, 2017, the contents of which are fully incorporated herein by reference.

TECHNOLOGICAL FIELD

The disclosure is directed to a housing or a bearing carrier having two components mounted in a base body and connected to each other by a force transmission mechanism.

BACKGROUND

A bearing carrier is known, which includes a first rolling-element bearing and a second rolling-element bearing, which are connected to each other by a base body of the bearing carrier, which base body is made of metal plate.

In particular in the field of automobile manufacturing and thus also with bearing carriers and housing parts in this field, the topic of lightweight construction plays an important role. Consequently there is a trend to reduce the weight of individual components in vehicles. This can be effected, for example, by material changes, wherein, however, it must be ensured that technical features, such as, for example, required strengths and temperature resistance continue to be satisfied. In today's bearing carriers/housing covers aluminum casting, steel casting, metal-plate constructions, or solid steel plates are usually used as the carrier base for the rolling-element bearings.

Furthermore, with housing covers that are used in electric motors, current passage can occur, which can lead to damage to the integrated rolling-element bearings. The above-mentioned classical materials for the bearing carrier/housing cover have no current-insulating properties.

In today's applications it is partially attempted to reduce the weight of the bearing carrier/housing cover by the use of cast parts made of magnesium. The processing of magnesium material as a bearing carrier/housing cover bears the risk of fires in manufacturing and must therefore be carried out carefully. In the last two decades stamped and shaped carrier plates have been implemented for use in the bearing carriers for use in automobile transmissions. However, due to the increasing demands on component strengths, embodiments are now reaching their limits.

Rolling-element bearings including ceramic rolling elements have proven to be an effective approach against current passage. Furthermore, there is the possibility of ceramic-coated rolling-element bearing rings, which, however, are not quite as effective against current passage as ceramic rolling elements.

SUMMARY

An aspect of the disclosure is in particular to provide a bearing carrier of the above-described type or a housing component of the above-described type with a high efficiency.

The disclosure arises from a bearing carrier or housing part including a first and at least one second component and including a base body, which is connected to the first and the at least one second component.

It is proposed that the bearing carrier or the housing part include at least one element, which is slack in a state where it is uninstalled and disconnected from the base body, and which, in a state where the bearing carrier or the housing part is completely manufactured and the element is connected to the base body, transmits at least a partial amount of forces, which may act on the first component, from the first component at least partially onto the second component. A high efficiency can be achieved using an inventive design. In particular a simple and effective current insulation and a low weight can be achieved. In particular the housing part can be a housing cover or a part of a housing cover.

A bearing carrier or housing part is further proposed including a first and at least one second component and including a base body which is connected to the first and the at least second component, and including at least one element that is configured as a belt and/or a cable and/or a roving, and which transmits at least a partial amount of forces, which may act on the first component, from the first component at least partially onto the second component. A high efficiency can be achieved using an inventive design. In particular a simple and effective current insulation and a low weight can be achieved. In particular the housing part can be a housing cover or a part of a housing cover.

Furthermore a bearing carrier or housing part is proposed including a first and at least one second component and including a base body, which is connected to the first and the at least second component, wherein the bearing carrier or the housing part includes at least one element that differs from the base body and that, in a state where the bearing carrier or the housing part is disconnected from other constructive units, connects the first component to the at least second component for the transmitting of forces. A high efficiency can be achieved using an inventive design. In particular a simple and effective current insulation and a low weight can be achieved. In particular the housing part can be a housing cover or a part of a housing cover. In particular the element is formed separately from the components.

The element preferably forms at least one loop. A simple force transmissibility between the two components can thereby be achieved. In particular the element can form a closed, for example, annular, loop, and/or a non-closed loop, such as, for example, a winding.

The loop advantageously surrounds the first component and the at least second component. In this way a constructively simple design can be achieved.

In addition it is proposed that the element and/or the first component and/or the at least second component is at least partially embedded in the base body. In this way a simple manufacturability can be achieved.

The first and/or the at least second component is preferably an outer ring of a bearing or a bearing or a sleeve.

The base body advantageously includes plastic that is reinforced by fibers. A low weight can thereby be achieved with a high stiffness. In particular the plastic can be a thermoplastic or a thermosetting plastic or a compound made from various materials.

The bearing carrier or the housing part advantageously includes at least one reinforcing element on and/or in the base body, which reinforcing element is preferably comprised of at least one metallic material and/or of at least one metal-composite material.

It is further proposed that the element is at least partially metallic and/or is at least partially non-metallic and/or at least partially comprised of a composite material.

In addition a transmission, in particular in a motor vehicle, or compressor or electric motor including the bearing carrier or the housing part is proposed.

Furthermore a method is proposed for manufacturing a bearing carrier or a housing part, in particular an above-described bearing carrier or housing part, wherein a first component of the bearing carrier or of the housing part is coupled with at least one second component of the bearing carrier or of the housing part by at least one element that is flexible in an uninstalled state. A high efficiency can be achieved using an inventive design. In particular a simple and effective current insulation and a low weight can be achieved. In particular the housing part can be a housing cover or a part of a housing cover.

Further advantages arise from the following description of the drawings. An exemplary embodiment of the disclosure is depicted in the drawings. The drawings, the description, and the claims contain numerous features in combination. The person skilled in the art will also advantageously consider the features individually and in further meaningful combinations.

DETAILED DESCRIPTION

Figure 1:
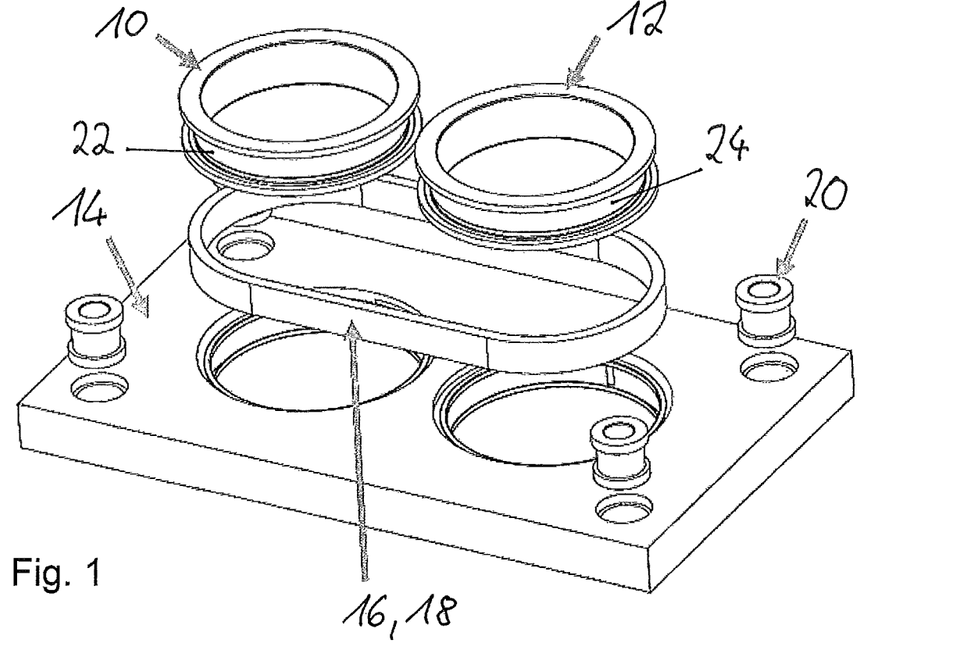
FIG. 1 shows a schematic exploded view of an inventive bearing carrier.
Figure 2:
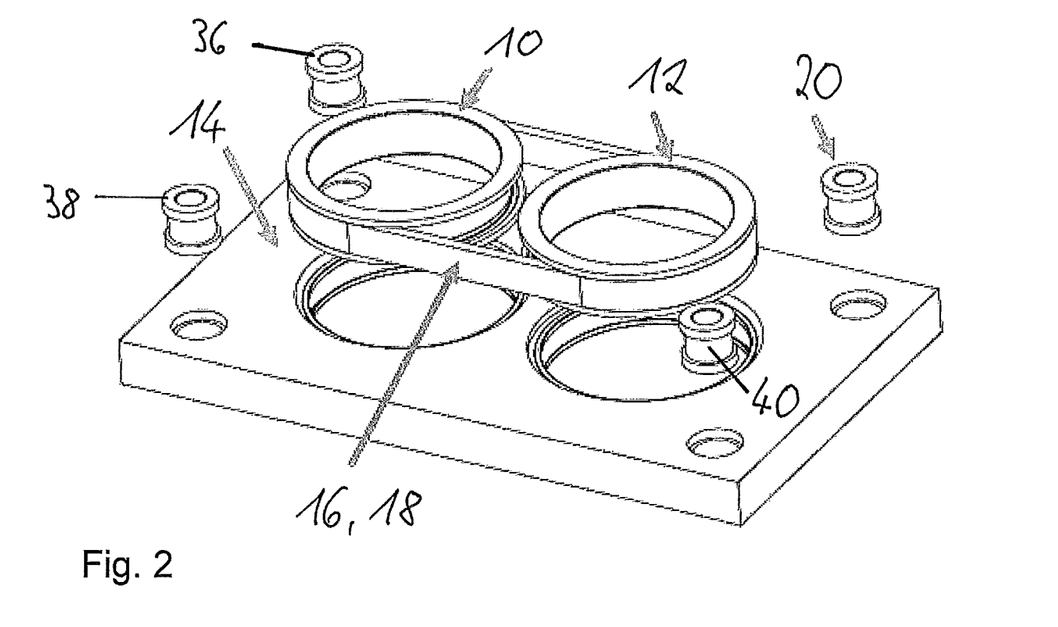
FIG. 2 shows a schematic exploded view of the bearing carrier, wherein an element surrounds two outer rings.
Figure 3:
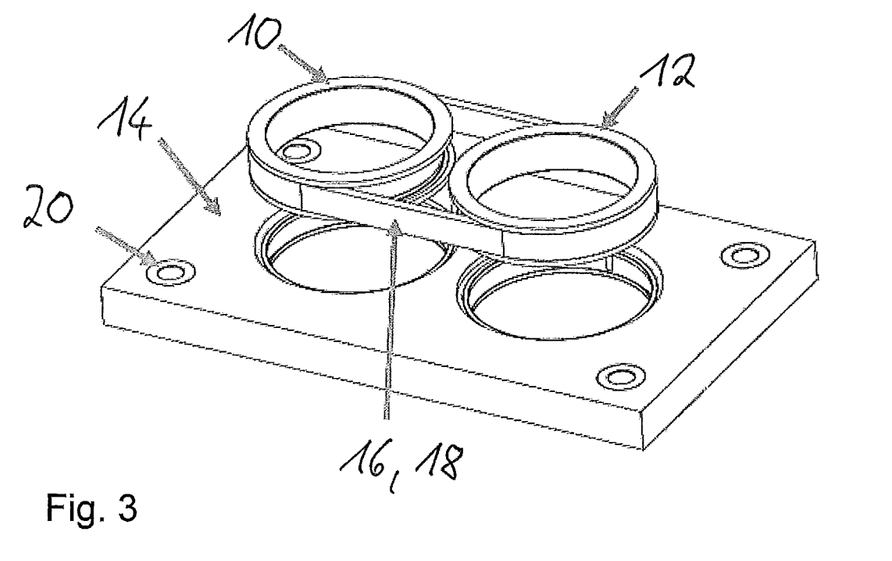
FIG. 3 shows a further exploded view of the bearing carrier, wherein sleeves are attached to a base body of the bearing carrier.
Figure 4:
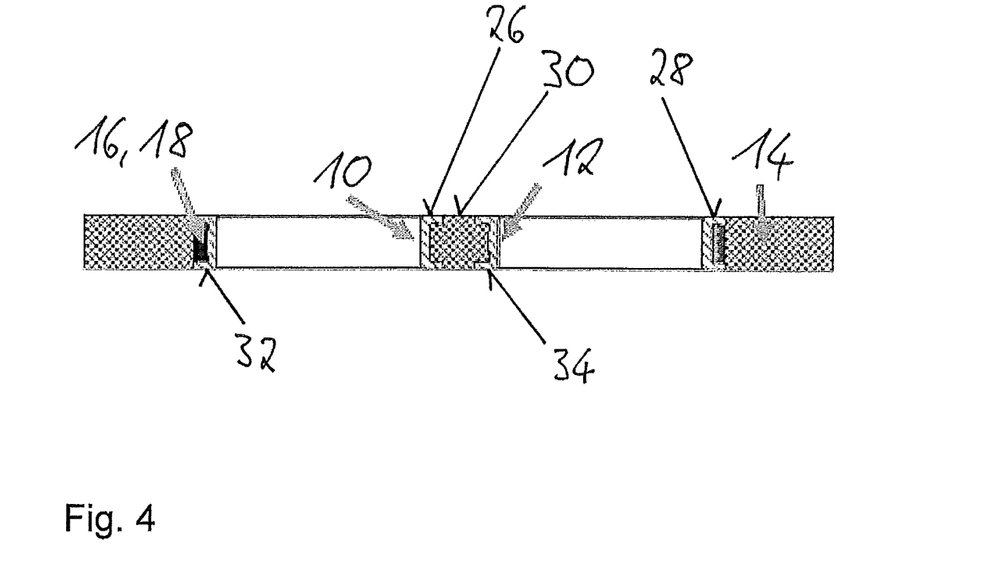
FIG. 4 shows a longitudinal section through the bearing carrier.

FIGS. 1 to 3 show exploded views of an inventive bearing carrier including a first and a second component 10, 12, which are each configured as outer rings of bearings. The components each include a groove 22, 24, which each fully extend around the respective outer ring in the circumferential direction. Furthermore the bearing carrier comprises an element 16, which is configured as a roving. The element 16 has the shape of a loop 18. Furthermore the bearing carrier includes a base body 14. The elements are attached on the base body, and specifically such that they are partially embedded in the base body. That is, the components 10, 12 are permanently embedded within the material of the base body 14 (i.e., cannot be removed without destroying the body 4), as best shown in FIG. 4. Since the element 16 is a roving, in a state wherein it is not installed in the bearing carrier it is slack. In a state wherein the bearing carrier is completely manufactured, the element 16 is embedded in the base body and thereby connected to the base body.

The base body essentially has a plate shape. The components 10,12 are adjacently disposed. In addition an end surface 26 of the component 10 is parallel to an end surface 30 of the base body. Furthermore an end surface 28 of the component 12 is parallel to the end surface 30 of the base body. The end surfaces 26 and 28 lie in the same, first, plane. Furthermore a further end surface 32 of the component 10 and a further end surface 34 of the component 12 both lie in a second plane, which is spaced from the first plane. The element 16 is disposed between the first and the second planes.

In principle different forces can be exerted on the components 10, 12 in an operating process. If forces act on the first component 10 that are directed in a direction away from the second component 12, then the element 16 transmits these forces at least partially onto the component 12. The transmission of the forces occurs because the loop 18 surrounds the two components 10,12 and is disposed partially in the groove 22 and also partially in the groove 24. The element 16 abuts on a region of a groove base of the groove 22, which has a shape of a first cylinder casing segment that extends over approximately 180°, on the component 10. The first cylinder casing segment is part of one half of the component 10, which is directed away from the component 12. The element 16 further abuts on a region of a groove base of the groove 24, which has a shape of a second cylinder casing segment that extends over approximately 180°, on the component 12. The second cylinder casing segment is part of one half of the component 12, which is directed away from the component 10.

Furthermore the bearing carrier includes four sleeves 20, 36, 38, 40 that are each partially embedded in the base body and are thereby attached to the base body. Using the sleeves the bearing carrier is attachable, for example, to a housing, in particular by screwing. For this purpose the sleeves can include an internal thread. The sleeves are made of aluminum.

The base body includes plastic that is reinforced by fibers. The plastic can be, for example, thermosetting plastic or thermoplastic. The element 16 includes approximately 12,000 carbon fibers. In alternative exemplary embodiments the base body can also be made of, for example, compound materials, fiber compound materials, or elastomers.

As already mentioned, the components 10, 12 are outer rings and can respectively be outer rings of a bushing or rolling-element bearing, wherein the rolling-element bearing can be of practically any design, such as in particular a ball bearing, cylindrical roller bearing (outer ring with or without flanges), tapered roller bearing, angular contact ball bearing, four-point contact ball bearing, etc.

The bearing carrier can also be used as a housing cover and thus as a housing part.

The bearing carrier can be installed in a transmission of a motor vehicle, in particular of an automobile or truck. As a housing part or housing cover it can be part of a compressor or electric motor.

Alternatively the element 16 can also be metallic, such as, for example, a metal-plate band or a stamped metal-plate loop or a wire winding. Furthermore the element 16 can also alternatively be made of a composite material, such as, for example, glass fibers, aramid fibers, natural fibers, or metal-nonmetal composites.

The bearing carrier can include further inserts. These can, for example, be made of steel, aluminum, or generally from light metals and their alloys, or from fiber composite materials.

In addition to the components 10, 12, further inserts can alternatively also be completely omitted, in particular if their function, such as a function as attachment element or as centering element or a function as guide element, for example, for shafts, can be directly integrated into the base body. For this purpose the base body can also, for example, be mechanically post-processed in order to integrate the functions mentioned.

Below the production of the bearing carrier is described.

Figure 5:
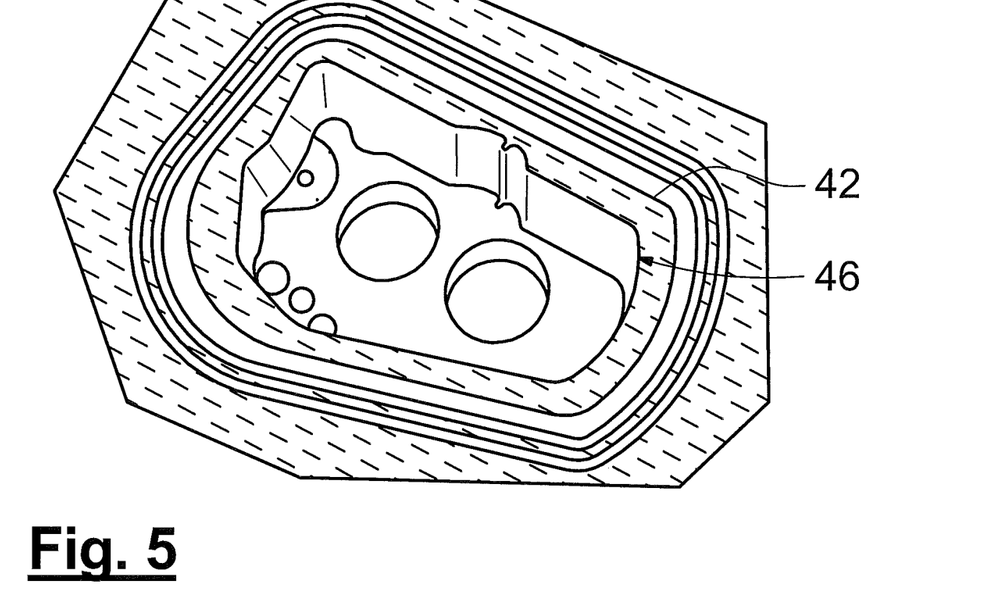
FIG. 5 shows a first tool half for manufacturing of the bearing carrier.

In a method for manufacturing the bearing carrier, in a first step the components 10, 12, the sleeves 20, 36, 38, 40, and two tool halves 42, 44 (FIGS. 5 and 6) are cleaned with a solvent. Subsequently a roving strand is inserted into the grooves 20, 24. Thereafter the preload of the roving strand is set by a clamp. Furthermore it is controlled by weighing whether the roving strand has the correct number of fibers. After the roving strand is disposed in the grooves it is shortened to the correct length and its ends are adhered together, whereby the element 16 is manufactured. Finally the tool halves are dampened in order to be able to achieve an easy releasing of the bearing carrier from the tool halves at the end. Thereafter while the element 16 is wound around them, the components 10, 12 are inserted into a recess 46 of the tool halves 42, 44, wherein the components 10, 12 are positioned correctly in the recess (FIGS. 5 and 7) with the help of cylinders 50, 52. Here the cylinders are inserted in through-holes of the tool half 42. In addition, the sleeves are inserted in bores of the tool halves 42 that are disposed in the recess 46, wherein O-rings are used for sealing.

At room temperature a mixture of approximately 6-mm-long carbon fibers with epoxy resin is produced, wherein the fiber proportion is approximately 40 percent by volume. The mixing can be carried out, for example, using a spatula.

Figure 6:
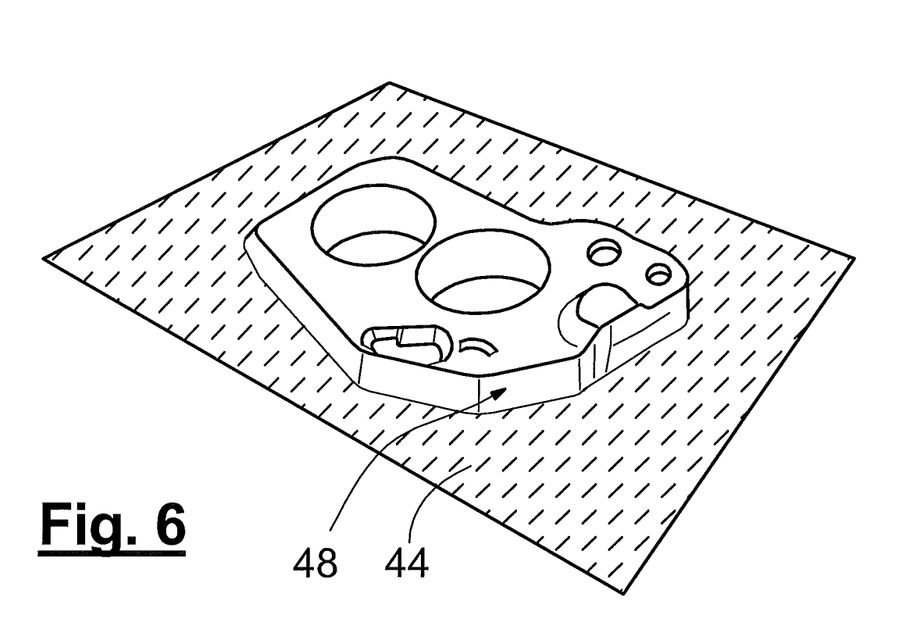
FIG. 6 shows a second tool half for manufacturing of the bearing carrier.
Figure 7:
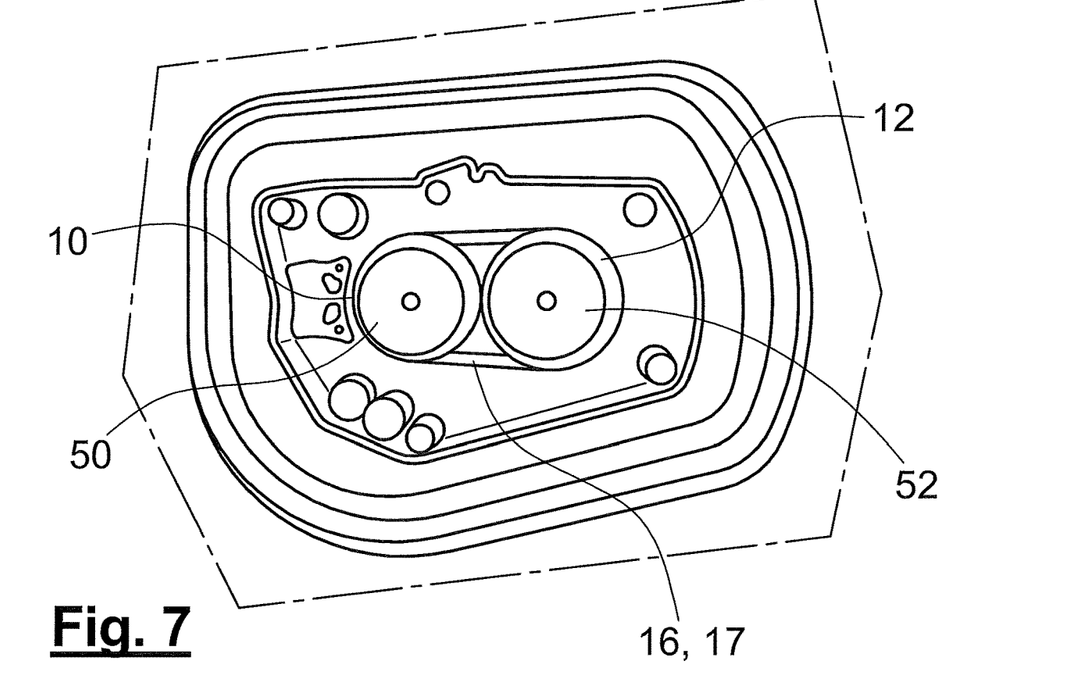
FIG. 7 shows a first state in a manufacturing of the bearing carrier.

FIG. 6 shows a second tool half 44 including an elevation 48.

Figure 8:
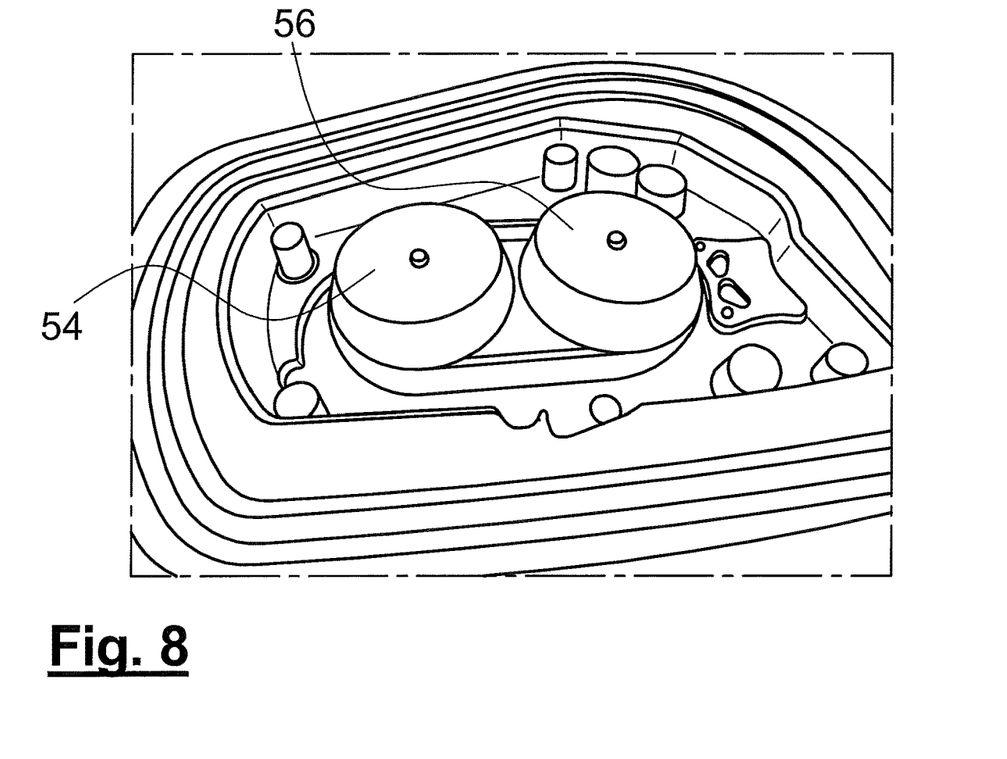
FIG. 8 shows a second state in a manufacturing of the bearing carrier.
Figure 9:
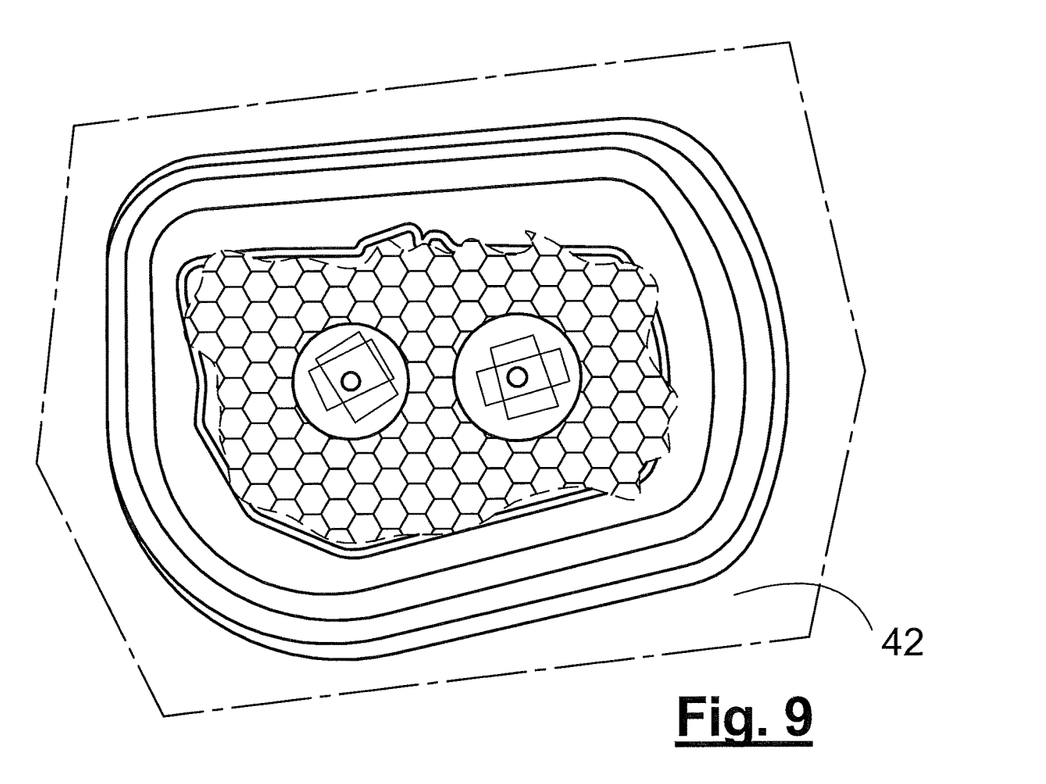
FIG. 9 shows a third state in a manufacturing of the bearing carrier.
Figure 10:
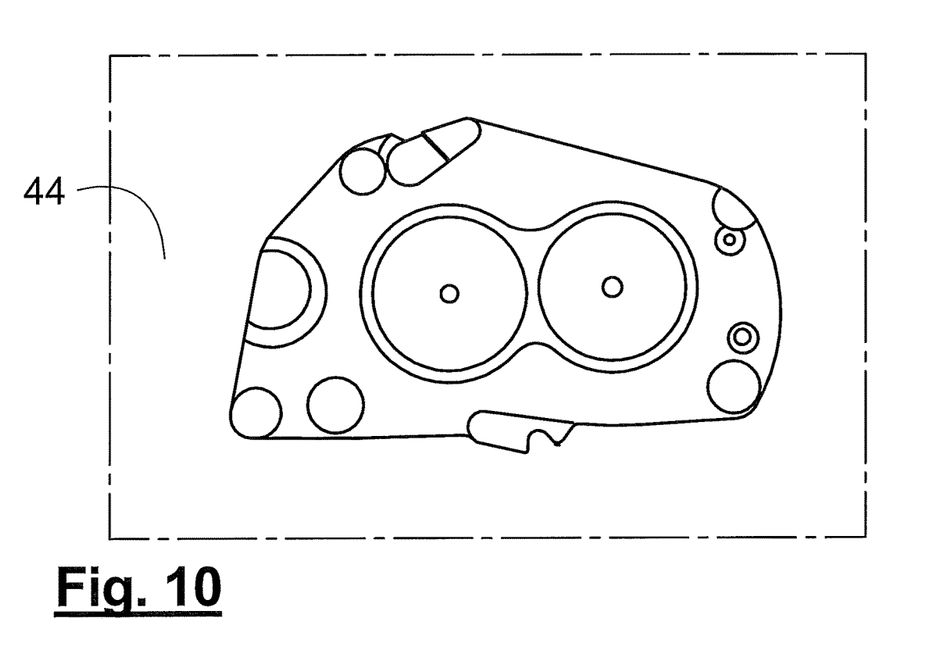
FIG. 10 shows a fourth state in a manufacturing of the bearing carrier.

For delimitation two caps 54, 56 are subsequently set onto the end surfaces of the components 10, 12 and fixed using screws (FIG. 8). The mixture is then filled-in into the recess 46, and the caps are sealed with adhesive tape at the locations of the two screw connections (FIG. 9). Furthermore, the mixture is somewhat condensed by compressing. On the second tool half 44 the recesses that will form contact regions for the caps in a subsequent compressing are filled with silicone in order to generate pressure on the caps and to ensure a sealing (FIG. 10).

Finally the elevation 48 of the tool half 44 is introduced into the recess 46 of the tool half 42, and the tool halves are positioned in a press and connected to a temperature sensor. Thereafter, using the press pressure is exerted onto the mixture and reduced again. With the help of the temperature sensor a temperature of 90° C. is set for the mixture, which lasts approximately 15 minutes. The process of building up pressure and reducing it again is carried out three times, whereby excess material is removed through overflow channels in the tool halves. In the third buildup of pressure the pressure reaches 150 bar, which is then retained together with the temperature of 90° C. for 1 hour. Subsequently the temperature of the tool half 44 is set to 110° C. and the temperature of the tool half 42 to 130° C. since the tool halves have different thickness. A temperature of 120° C. is sought for the mixture. The temperature of 120° C. is maintained for 3 hours at a pressure of 150 bar. Thereafter the heating is discontinued and as a result cooled 90 minutes under pressure. Finally the tool halves are removed from the press. The tool half 44 and the caps are removed. The preform thus manufactured of the bearing carrier is pressed out of the tool half 42, and excess material is removed at its corners. Subsequently an 8-hour-long tempering at 160° C. is carried out in an oven, from which a glass transition temperature of 140-145° C. results. Finally a milling of the sleeves occurs.

In an alternative embodiment the element 16 surrounds not only the two components but additionally also one or more further components, such as in particular a sleeve. Furthermore it is conceivable that only one or none of the components that surrounds the element 16 is an outer ring of a bearing.

In principle the embedding of the components and/or the sleeves can also be effected by an injecting or a casting. Furthermore it is conceivable that further inserts analogous to the components are integrated into the base body or integrated into the base body after manufacturing thereof. The inserts can in particular be attachment elements or centering elements or guide elements.

Furthermore, it is conceivable that in the manufacturing the components are not outer rings but rather bearings that each include inner ring, outer ring and optionally rolling elements.

Due to the coupling of the outer rings with the loop a highly accurate arrangement is achieved in particular.

In some exemplary embodiments the fibers can be omitted in the manufacturing.

In particular glass fibers can be used alternatively to carbon fibers.

In other exemplary embodiments the use of components 10, 12 is omitted and the roving strand is, for example, fitted on the outer surfaces of the components, which are then given by smooth cylinder casings. It is also possible to form the contact surfaces between the element 16 and the components 10, 12 by contours deviating from a groove shape.

Furthermore it is possible to install additional elements, for example, for force transmission and/or guiding of the element 16 on the components 10, 12. These are representable, for example, from metallic, non-metallic, or from composite materials.

Due to the coupling of the components using the element 16, forces that act on the components are distributed more evenly.

Alternatively to the described manufacturing method by pressing and heating, a manufacturing can in particular also be effected by methods for the processing of thermosetting plastics, such as in particular resin transfer molding, bulk molding compound processes, the prepreg method, foaming, or by methods for processing thermoplastics, such as in particular injection molding or thermoforming, or by generative production methods, such as in particular stereolithography or 3D printing.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved bearing carrier or housing part.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

10 Component
12 Component
14 Base body
16 Element
18 Loop
20 Sleeve
22 Groove
24 Groove
26 End surface
28 End surface
30 End surface
32 End surface
34 End surface
36 Sleeve
38 Sleeve
40 Sleeve
42 Tool half
44 Tool half
46 Recess
48 Elevation
50 Cylinder
52 Cylinder
54 Cap
56 Cap

What is claimed is:

1. A bearing carrier or a housing part comprising:
a base body;
a first component and at least one second component mounted in the base body; and
a belt or a cable formed from a material different than a material of the base body and different from a material of the first component and different from a material of the second component,
wherein, when the bearing carrier is disconnected from other constructive units, the belt or the cable at least partially transmits forces applied against the first component to the at least one second component;
wherein the first component and the second component are permanently embedded within the material of the base body.

2. The bearing carrier or the housing part according to claim 1, wherein the belt or the cable is slack when disconnected from the base body.

3. The bearing carrier or the housing part according to claim 1,
wherein the first component and the second component each comprise a ring having a cylindrical inner surface and an outer surface having a groove, and
wherein the belt or the cable passes through the groove of the first component and the groove of the second component and is embedded in the base body.

4. The bearing carrier or the housing part according to claim 3, wherein the cylindrical inner surface of each of the first component and the second component is an outer ring of a bearing.

5. The bearing carrier or the housing part according to claim 1, wherein the base body includes fiber-reinforced plastic.

6. A bearing carrier or a housing part comprising:
a base body;
a first component and at least one second component mounted in the base body; and
a belt or a cable connected to the base body and to the first component and the second component such that the belt or the cable at least partially transmits forces that act on the first component to the second component,
wherein the element is slack before it is installed in the bearing carrier or the housing part, and
wherein the first component and the second component are permanently embedded within the material of the base body.

7. The bearing carrier or the housing part according to claim 6, wherein the belt or the cable is formed from a material different than a material of the base body and different from a material of the first component and different from a material of the second component.

8. The bearing carrier or the housing part according to claim 6,
wherein the first component and the second component each comprise a ring having a cylindrical inner surface and an outer surface having a groove, and
wherein the belt or the cable passes through the groove of the first component and the groove of the second component and is embedded in base body.

9. The bearing carrier or the housing part according to claim 8, wherein the cylindrical inner surface of each of the first component and the second component is an outer ring of a bearing.

10. The bearing carrier or the housing part according to claim 6, wherein the base body includes plastic that is reinforced by fibers.

11. A bearing carrier or a housing part comprising:
a base body;
a first component and at least one second component mounted in the base body; and
a belt or a cable connected to the base body and to the first component and the second component such that the belt or the cable at least partially transmits forces that act on the first component to the second component; and
wherein the first component and the second component are permanently embedded within the material of the base body.

12. The bearing carrier or the housing part according to claim 11, wherein the belt or the cable is slack before it is installed in the bearing carrier or the housing part.

13. The bearing carrier or the housing part according to claim 11, wherein the belt or the cable is formed from a material different than a material of the base body and different from a material of the first component and different from a material of the second component.

14. The bearing carrier or the housing part according to claim 11,
wherein the first component and the second component each comprise a ring having a cylindrical inner surface and an outer surface having a groove, and wherein the belt or the cable passes through the groove of the first component and the groove of the second component and is embedded in the base body.

15. The bearing carrier or the housing part according to claim 14, wherein the cylindrical inner surface of each of the first component and the second component is an outer ring of a bearing.

16. The bearing carrier or the housing part according to claim 14, wherein the base body includes plastic that is reinforced by fibers.

17. A transmission for a motor vehicle, or for a compressor or for an electric motor, including a bearing carrier or a housing part according to claim 11.

* * * * *